US006328505B1

(12) United States Patent
Gibble

(10) Patent No.: US 6,328,505 B1
(45) Date of Patent: Dec. 11, 2001

(54) DRILL GUIDING DEVICE

(76) Inventor: Howard Gibble, 895 Gible Rd., Mt. Joy, PA (US) 17552

( * ) Notice: Subject to any disclaimer, the term of this patent is extended or adjusted under 35 U.S.C. 154(b) by 0 days.

(21) Appl. No.: 09/534,602

(22) Filed: Mar. 27, 2000

(51) Int. Cl.$^{7}$ .......... B23B 45/02
(52) U.S. Cl. .......... 408/16; 408/710
(58) Field of Search .......... 408/16, 710

(56) References Cited

U.S. PATENT DOCUMENTS 2,855,679 * 10/1958 Gibble .......... 408/16
4,078,869 * 3/1978 Honeycutt .......... 408/16

FOREIGN PATENT DOCUMENTS

2362550 * 6/1975 (DE) .......... 408/16

* cited by examiner

*Primary Examiner*—Daniel W. Howell
(74) *Attorney, Agent, or Firm*—Norman B. Rainer

(57) ABSTRACT

A device for aligning a hand-held electric drill to a vertical position with respect to a flat workpiece includes a disc-shaped circular housing having a centered axis, upper and lower faces, and a channel centered on the axis in communication with both faces. A gripping feature associated with the channel permits removable attachment of the housing to a rotating component of the drill, such as the drill shaft or drill bit. A light-emitting component within the housing directs a narrow beam of visible light downwardly from the lower face. When the drill is vertically aligned, the beam of light produces a circular path on the workpiece.

5 Claims, 4 Drawing Sheets

DRILL GUIDING DEVICE

BACKGROUND OF THE INVENTION

1. Field of the Invention

This invention relates to electric drills used for producing circular holes in workpieces, and more particularly concerns a device to facilitate vertical alignment of the drill with the workpiece.

2. Description of the Prior Art

Hand held electric drills are widely used for producing circular holes in workpieces. It is generally sought to produce holes which are perpendicular to the surface of the workpiece. Proper alignment of the drill to produce such perpendicular holes is difficult. Even if such alignment is fortuitously established at the initiation of the drilling of a hole, alignment of the drill may change during the drilling operation.

Attempts to alleviate this problem have resorted to the use of frameworks which secure the electric drill and guide the motion toward the workpiece. Such framework devices are however unwieldy, and are particularly cumbersome when many holes must be drilled.

Other efforts to align the drill have involved the incorporation of a carpenter's type air bubble sight glass often called a spirit level into the drill. However, the use of a level detector device is effective only when the workpiece surface is horizontally disposed; and in fact a separate leveling device is then needed to assure the horizontal disposition of the surface of the workpiece.

Because the location of such spirit levels is removed from the actual site of drilling, it is difficult for operator to continuously observe both the level and the site of drilling during the drilling procedure. Errors further occur because of parallax distortion in viewing the spirit level, and the fact that extremely slight displacement of the air bubble within the confining sight glass tube or dome is equivalent to a large departure from perpendicular.

It is accordingly an object of the present invention to provide a device for aligning a hand-held electric drill perpendicular to a work surface.

It is a further object of this invention to provide a device as in the foregoing object wherein the operator's visualization of perpendicularity is directly upon the workpiece.

It is another object of the present invention to provide a device of the aforesaid nature which enables the operator of the drill to continuously monitor alignment while drilling a perpendicular hole.

It is a still further object of this invention to provide a device of the aforesaid nature which is easily attachable to any drill and does not encumber normal operation of the drill.

These and other beneficial objects and advantages will be apparent from the following description.

SUMMARY OF THE INVENTION

The above and other beneficial objects and advantages are accomplished in accordance with the present invention by a device comprising:

a) a disc-shaped housing having a centered axis, upper and lower faces, and a channel centered on said axis in communication with said faces, b) friction-based gripping means associated with said channel, c) means within said housing for emitting at least one narrow beam of visible light, said beam of light being downwardly directed from said lower face, and d) a battery within said housing for energizing said light emitting means, e) said device being centrifugally balanced for rotation upon said axis.

The device is adapted to mount onto a drill shaft or drill bit by way of said channel. Upon rotation of the drill and attached device, a circle of light is projected onto the workpiece when the drill bit is exactly perpendicular to a flat workpiece. If perpendicularity does not exist, an oval-shaped pattern is projected upon the workpiece.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
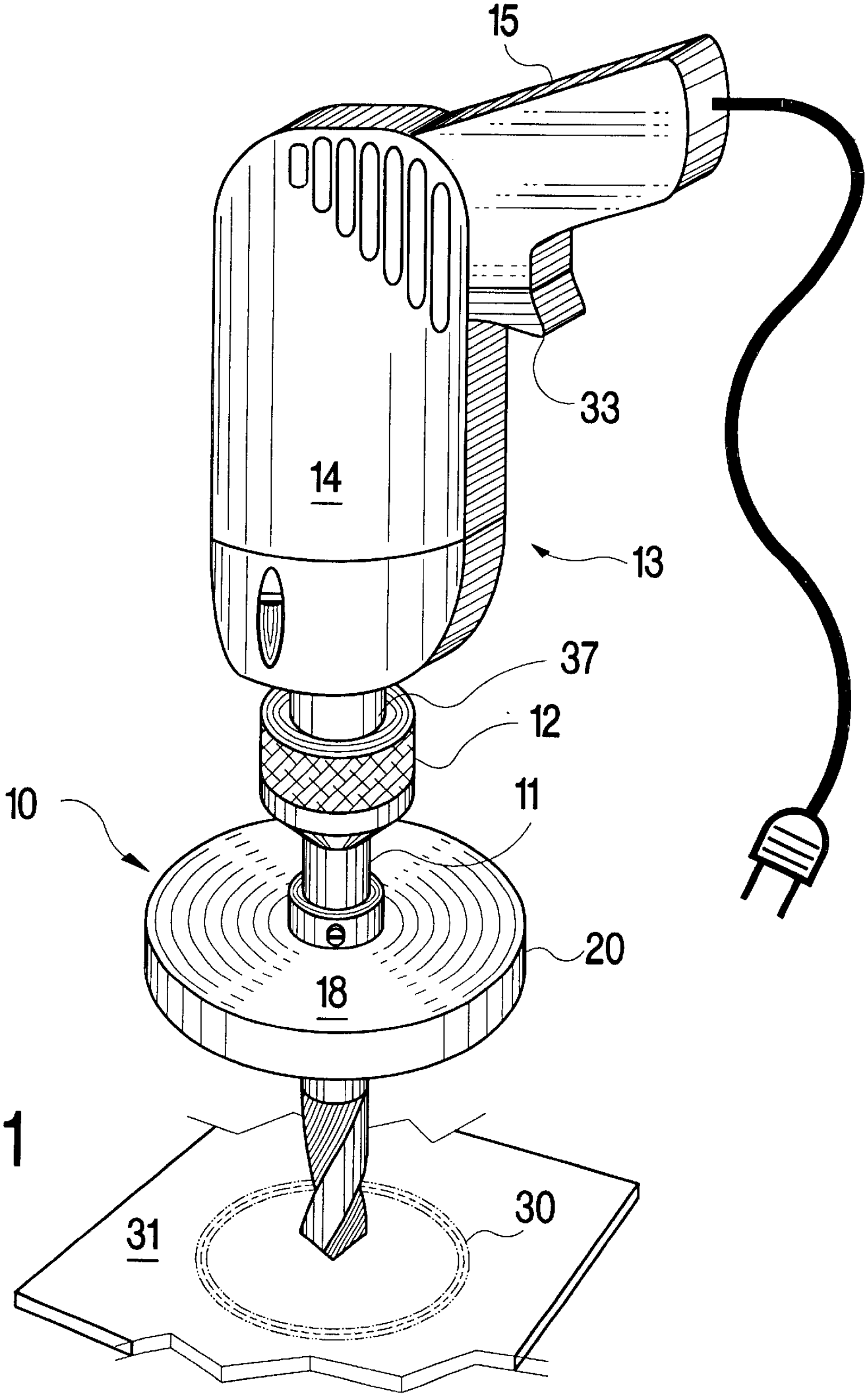
FIG. 1 is a perspective view showing an embodiment of the device of this invention in functional association with a conventional hand-held electric drill.
Figure 2:
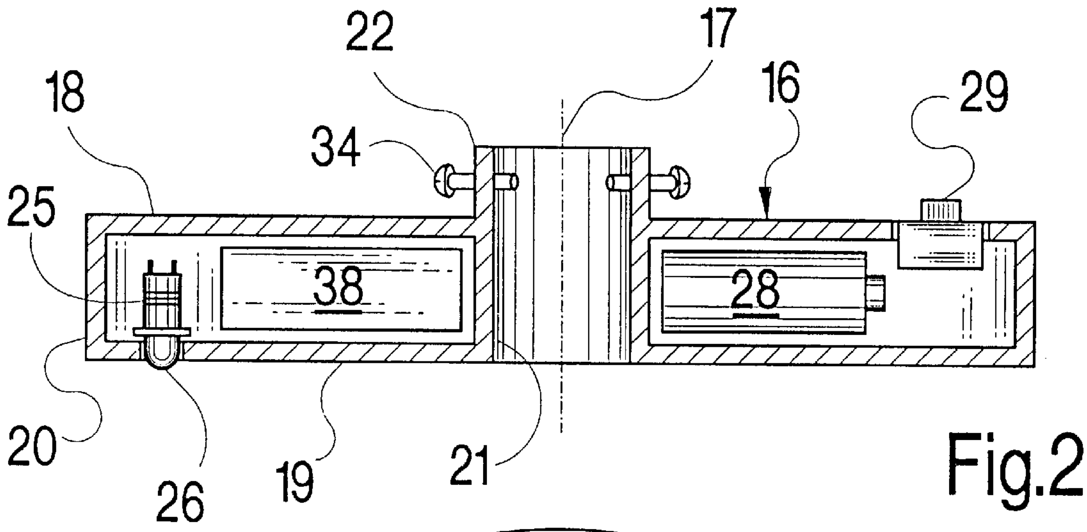
FIG. 2 is an enlarged vertical sectional view of the embodiment of FIG. 1.
Figure 3:
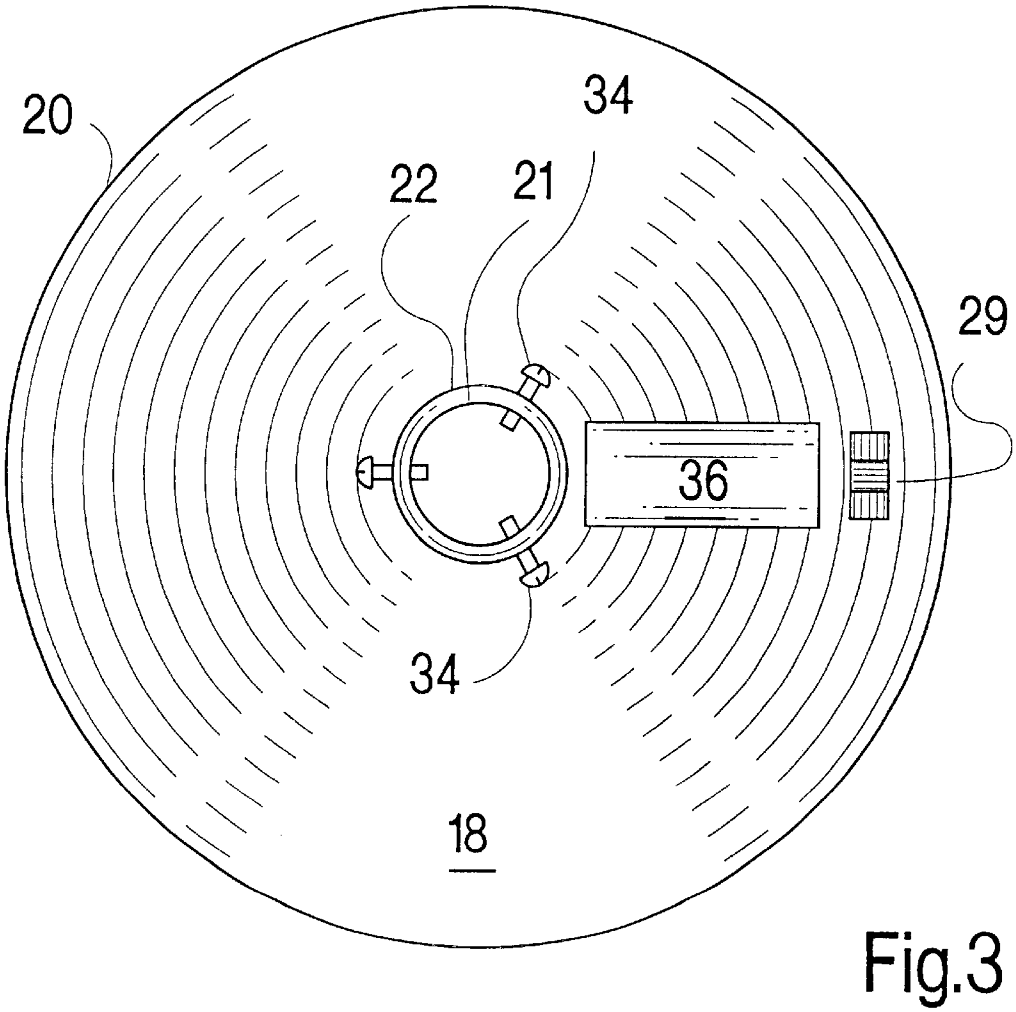
FIG. 3 is a top plan view.
Figure 4:
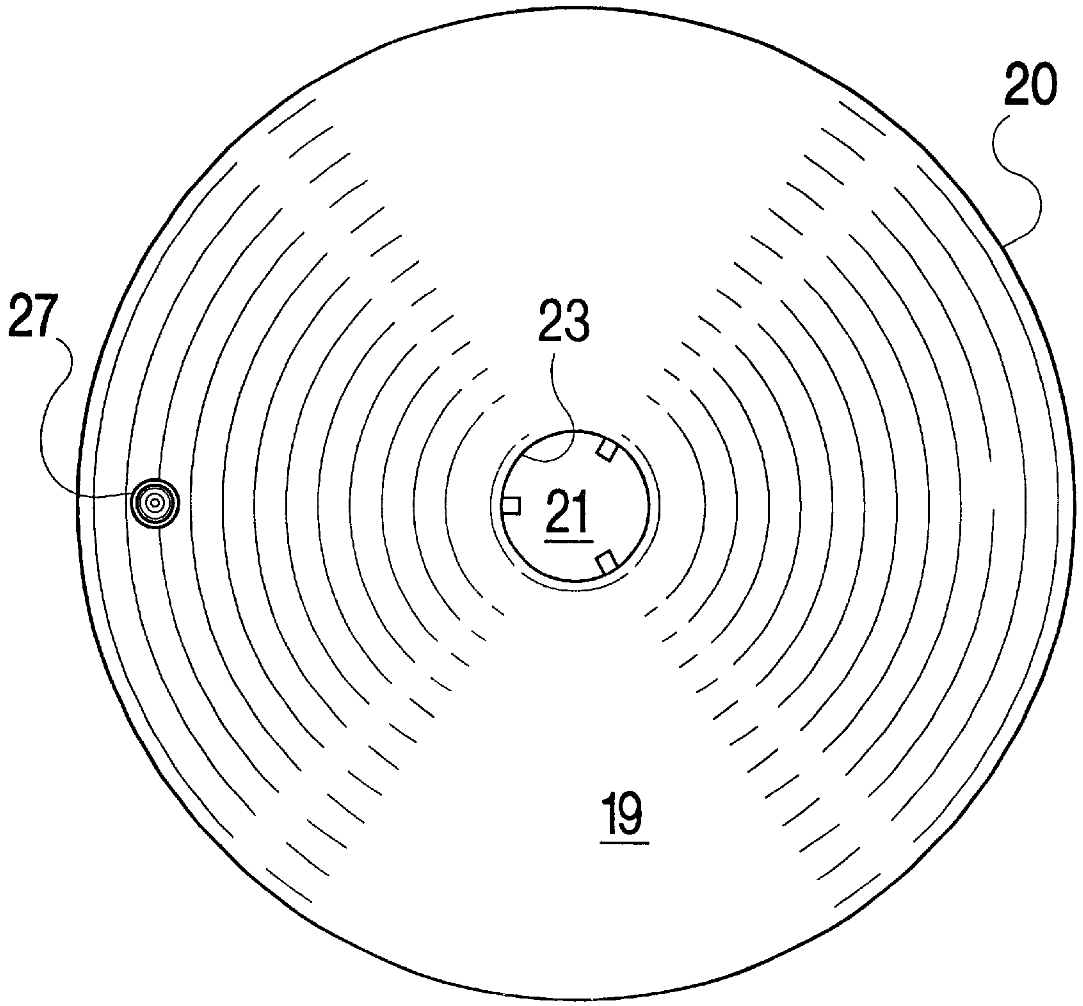
FIG. 4 is a bottom view.
Figure 5:
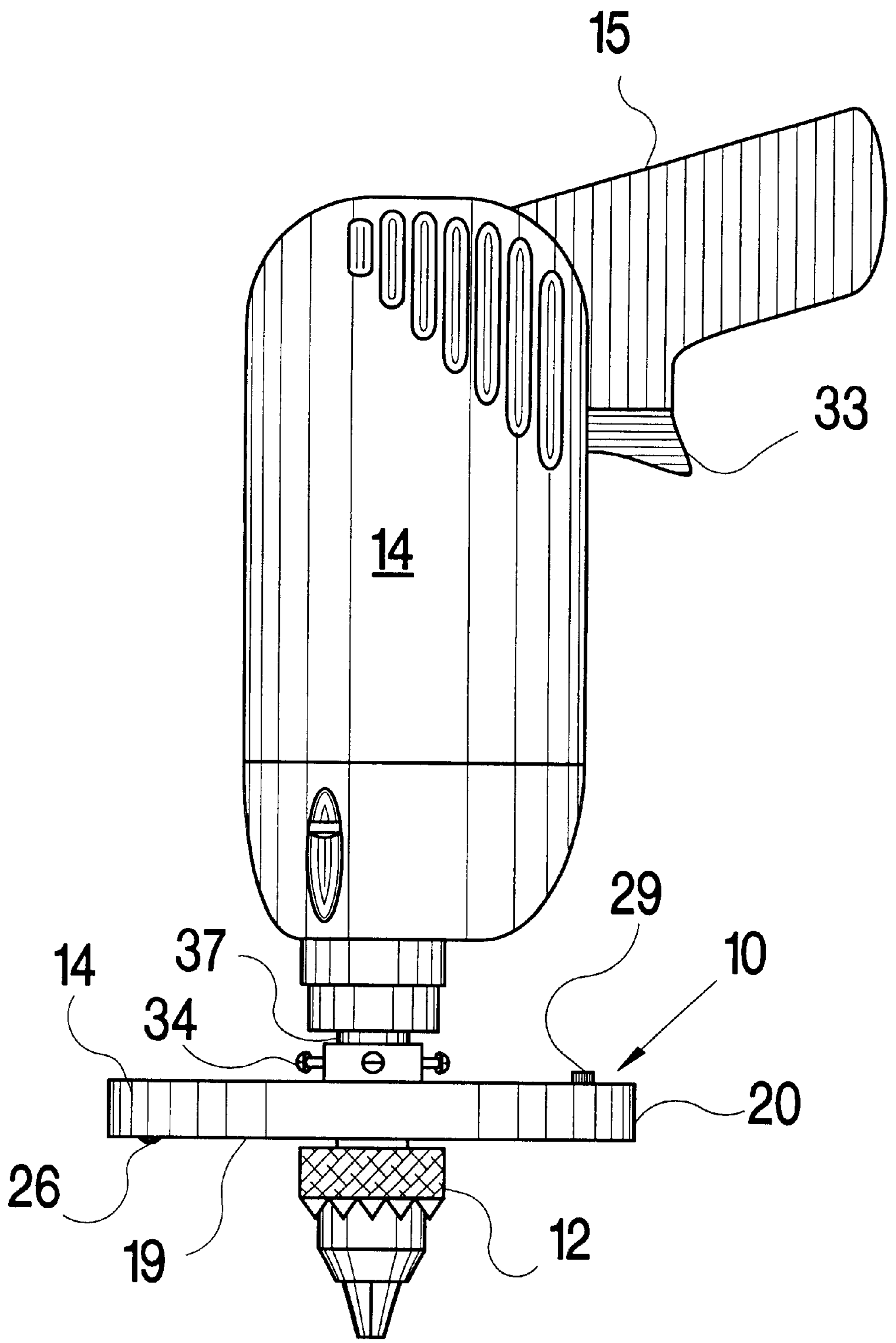
FIG. 5 is a side view of the embodiment of FIG. 1 shown in an alternative mode of functional association with said electric drill.

Referring to FIGS. 1–5, an embodiment of the alignment device 10 of this invention is shown affixed to a twist drill bit 11 held within the chuck 12 of a conventional hand-held electric drill 13. Said electric drill is comprised of a barrel-shaped housing 14 that confines a variable speed motor, a handle portion 15, and a motor controlling trigger switch 33. A drill shaft 37 is emergent from the forward extremity of housing 14, and removably secures chuck 12. The electric drill 13 shown in FIG. 1 is positioned such that twist drill bit 11 is vertically aligned with respect to a flat workpiece surface 31.

Alignment device 10 is comprised of a disc-shaped housing 16 having a centered rotational axis 17, upper and lower faces 18 and 19, respectively, a circular cylindrical perimeter sidewall 20, and a channel 21 which extends between said upper and lower faces.

Friction-based gripping means in the form of collar 22 extends upwardly from upper face 18 as a continuous extension of channel 21. Several radially spaced machine bolts 34 threadably engage collar 22 and are positioned so as to orthogonally intersect axis 17 at a single site in opposing interrelationship. The use of three such machine bolts is preferable because they provide assured centering of a drill bit 11 that they engage.

A light emitting device 25, which may be an incandescent bulb or light emitting diode is disposed within housing 16. The light emitting device is associated with collimating means such as a lens 26 or equivalent structure for causing the visible light from device 25 to be a directed, narrow beam. Said beam is downwardly emergent from said housing by passage through aperture 27 in lower face 19. In alternative embodiments, the light emitting device 25 may be a laser device, in which case a lens will not be required because the coherent light emitted from the laser is inherently collimated, namely a narrow, non-divergent beam. A number of said light emitting devices may be disposed in a circular locus about axis 17.

An electric storage battery 28 is disposed within said housing for energizing said light emitting means. Suitable electric conductors such as wires or printed circuits may connect the battery with said light emitting means and with an on/off switch 29 located in upper face 18. Suitable electrical contacts may be provided upon the exterior of the housing to facilitate re-charging of the battery. An access door 36 may be provided in said housing to permit battery replacement. A second battery or counterweight 38 is positioned within housing 16 in diametric opposition to battery 28 for the purpose of providing centrifugal balance for the device.

The various components of the alignment device of this invention are positioned in a manner such as to provide centrifugal balance with respect to axis 17. Accordingly, at high rotational speed, the alignment device will not produce vibration of the drill.

In using the alignment device of the present invention, bolts 34 are tightened onto a selected drill bit mounted in the chuck of the electric drill or are tightened onto shaft 37. The light emitting device is turned on by way of switch 29. The drill is positioned upon a workpiece, and rotation of the drill bit is begun slowly. A circuitous path of light surrounding the drill bit is formed upon the surface of the workpiece. The position of the drill is adjusted until the path of light is a perfect circle, and drilling is continued with increased drill speed while continually observing the shape of the circuitous path. The alignment device may be made in different sizes with respect to the diameter of housing 16 and channel 21 in order to accommodate drill bits or drill shafts of different ranges of diameters.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A device for aligning a hand-held electric drill to a vertical position with respect to a flat workpiece, said device comprising:

a) a disc-shaped circular housing having a centered axis, upper and lower faces, and a channel centered on said axis in communication with said faces, b) friction-based gripping means associated with said channel, c) means within said housing for emitting at least one narrow beam of visible light, said beam of light being downwardly directed from said lower face, and d) a battery within said housing for energizing said light emitting means, e) said device having centrifugal balance with respect to rotation upon said axis.

2. The device of claim 1 configured to mount onto a rotating component of said drill.

3. The device of claim 2 wherein said gripping means centers the device upon said rotating component.

4. The device of claim 3 wherein said gripping means includes a collar that extends upwardly from said upper face as a continuous extension of said channel.

5. The device of claim 4 further provided with an access door for battery replacement and an on/off control switch.

* * * * *